US009916619B2

(12) United States Patent
Nuzzi

(10) Patent No.: US 9,916,619 B2
(45) Date of Patent: Mar. 13, 2018

(54) PAYMENT SYSTEM WITH LOCATION RESTRICTIONS

(75) Inventor: Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 13/026,922

(22) Filed: Feb. 14, 2011

(65) Prior Publication Data

US 2012/0209768 A1    Aug. 16, 2012

(51) Int. Cl.
*G06Q 40/00* (2012.01)
*G06Q 40/02* (2012.01)

(52) U.S. Cl.
CPC ..................... *G06Q 40/02* (2013.01)

(58) Field of Classification Search
CPC ........ G06Q 40/00; G06Q 40/06; G06Q 40/04; G06Q 40/025
USPC .......................... 705/35–38, 38 R, 39, 40, 44
See application file for complete search history.

(56) References Cited

U.S. PATENT DOCUMENTS

| | | | | |
|---|---|---|---|---|
| 6,021,397 | A * | 2/2000 | Jones et al. | 705/36 R |
| 7,610,040 | B2 * | 10/2009 | Cantini | G06Q 20/04 340/5.9 |
| 7,707,105 | B2 * | 4/2010 | O'Neil | 705/39 |
| 7,840,494 | B2 | 11/2010 | Wiederin | |
| 7,899,750 | B1 | 3/2011 | Klieman et al. | |
| 8,301,502 | B2 * | 10/2012 | Livnat | G06Q 10/10 705/21 |
| 8,311,845 | B2 * | 11/2012 | Vengroff | G06Q 30/02 705/1.1 |
| 2001/0032183 | A1 | 10/2001 | Landry | |
| 2001/0042785 | A1 * | 11/2001 | Walker et al. | 235/379 |
| 2003/0182194 | A1 * | 9/2003 | Choey et al. | 705/16 |
| 2004/0117302 | A1 * | 6/2004 | Weichert et al. | 705/40 |
| 2008/0275820 | A1 * | 11/2008 | Joao et al. | 705/44 |
| 2009/0012898 | A1 * | 1/2009 | Sharma et al. | 705/44 |
| 2009/0094125 | A1 * | 4/2009 | Killian et al. | 705/17 |
| 2009/0157518 | A1 * | 6/2009 | Bishop et al. | 705/19 |
| 2010/0005013 | A1 | 1/2010 | Uriarte | |
| 2010/0257065 | A1 | 10/2010 | Gupta et al. | |
| 2010/0273504 | A1 * | 10/2010 | Bull et al. | 455/456.1 |
| 2011/0047075 | A1 * | 2/2011 | Fourez | 705/44 |
| 2011/0055862 | A1 | 3/2011 | Harp et al. | |
| 2011/0153495 | A1 * | 6/2011 | Dixon et al. | 705/39 |

(Continued)

OTHER PUBLICATIONS

PCT International Search Report, Application No. PCT/US2012/24805 dated May 10, 2012.

*Primary Examiner* — Lalita M Hamilton
(74) *Attorney, Agent, or Firm* — Haynes and Boone, LLP

(57) ABSTRACT

A method for restricting a payment from an account based on a user location includes receiving at least one payment location restriction for an account from a user device over a network. The at least one payment location restriction includes at least one authorized user location or at least one unauthorized user location for making payments using the account. The at least one payment location restriction is associated with the account in a database. A request to make a payment using the account is received over the network. A current user location is determined. The request to make the payment is then authorized or denied based, at least partly, on whether the current user location is included in the at least one authorized user location or the at least one unauthorized user location.

20 Claims, 11 Drawing Sheets

(56) References Cited

U.S. PATENT DOCUMENTS

| | | |
|---|---|---|
| 2011/0202466 A1* | 8/2011 | Carter .............................. 705/67 |
| 2012/0030110 A1* | 2/2012 | Prakash et al. ................. 705/44 |
| 2012/0101951 A1* | 4/2012 | Li ...................... G06Q 20/3829 |
| | | 705/71 |
| 2012/0130898 A1* | 5/2012 | Snyder et al. .................. 705/44 |
| 2012/0136781 A1 | 5/2012 | Fridman et al. |
| 2012/0196568 A1* | 8/2012 | Bakshi .......................... 455/411 |
| 2013/0159185 A1* | 6/2013 | Lee ................................. 705/44 |

\* cited by examiner

LOCATION RESTRICTIONS

Please select an account

ACCOUNT 102b

ACCOUNT 102c

ACCOUNT 102d

ACCOUNT 102c

How would you like to location restrict this account?

BY ZIP CODE — 102e

BY MAP — 102f

BY MERCHANT — 102g

USER DEVICE 102a

FIGURE 1b

PAYMENT SYSTEM WITH LOCATION RESTRICTIONS

BACKGROUND

Field of the Invention

The present invention generally relates to online and/or mobile payments and more particularly to a payment system that restricts account use based at least partially on an account user location.

Related Art

More and more consumers are purchasing items and services over electronic networks such as, for example, the Internet. Consumers routinely purchase products and services from merchants and individuals alike. The transactions may take place directly between on-line or conventional merchants or retailers and the consumer, and payment may be made by providing credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and/or mobile purchases are growing very quickly.

In some situations, it may be desirable to restrict where payments are made using financial information and/or mobile devices. However, conventional solutions to do so are limited. For example, some merchants provide specialized credit cards that may only be used with that merchant. Such solutions are overly restrictive in that they limit the payment functionality of the specialized credit card to a single merchant, and may require the payer to carry around a different specialized credit card for each merchant they may need to make payments to.

Thus, there is a need for an improved restricted payment system.

SUMMARY

According to one embodiment, a method for restricting a payment from an account based on a user location includes receiving at least one payment location restriction for an account from a user device over a network. The at least one payment location restriction includes at least one authorized user location or at least one unauthorized user location for making payments using the account, and the at least one payment location restriction is associated with the account in a database.

In an embodiment, the method receives a request to make a payment using the account over the network and determines a current user location. The method then authorizes or denies the request to make the payment using the account based, at least partly, one whether the current user location is included in the at least one authorized user location or the at least one unauthorized user location.

As a result, in one embodiment, an account holder may restrict usage of an account to particular locations so that the account may only be used to make purchases in locations chosen by the account holder. Thus, if the account holder gives a user authority to use the account by, for example, giving the user a mobile payment device or a credit card, the account holder may ensure that the account is only used in those particular locations. This may be particularly useful, for example, when the account holder is a parent and the user is a child, and the account holder would only like the account to be used for particular purchases with particular merchants.

These and other features and advantages of the present disclosure will be more readily apparent from the detailed description of the embodiments set forth below taken in conjunction with the accompanying figures.

BRIEF DESCRIPTION OF THE FIGURES

FIG. 1b is a front view illustrating an embodiment of user device being used to location restrict an account;

Figure 1A:
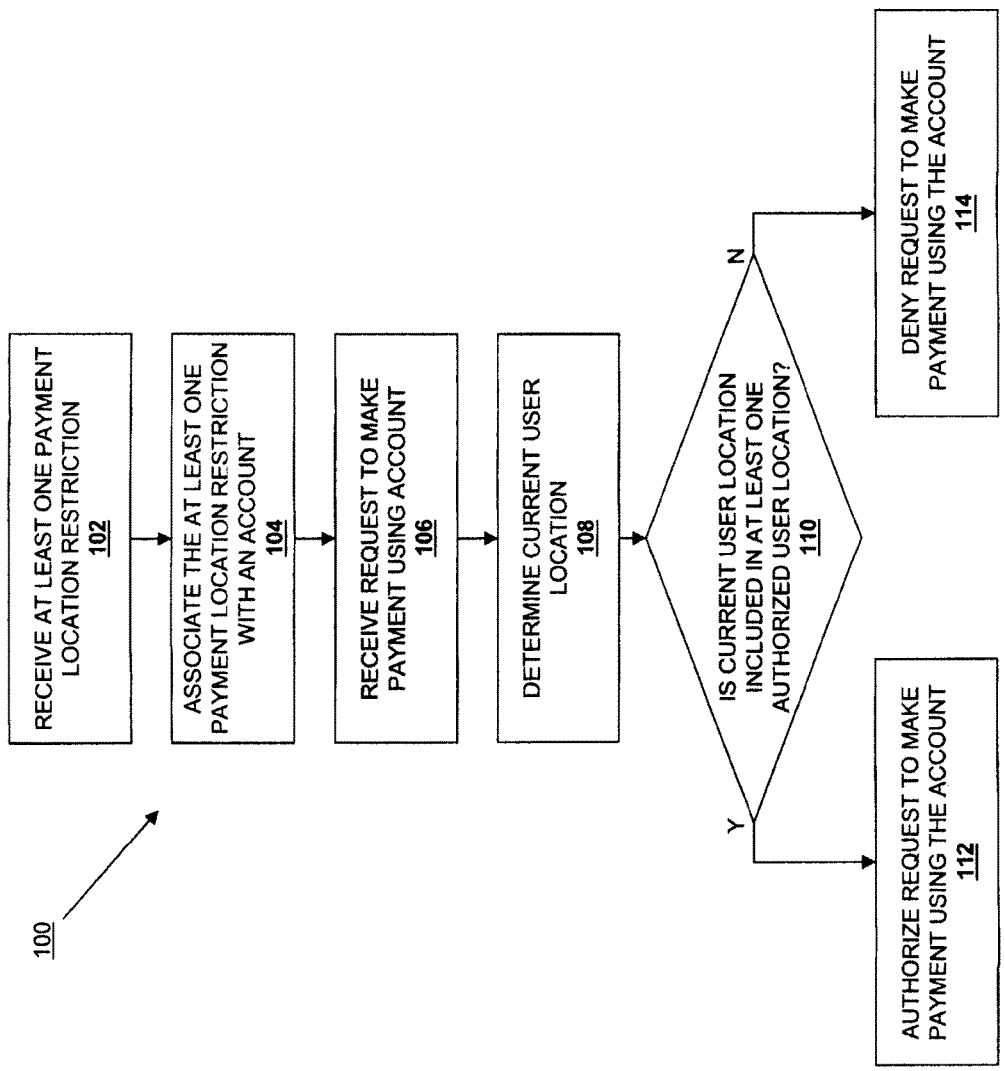
FIG. 1a is a flow chart illustrating an embodiment of a method for restricting payment from an account based on a user location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for restricting a payment from an account based on a user location. An account holder provides a payment service provider and/or an account provider at least one payment location restriction for an account, and the at least one payment location restriction includes at least one authorized user location or at least one unauthorized user location for making payments using the account. The payment service provider and/or account holder then associates the payment location restriction with the account. When a user attempts to use the account to make a payment, a current location of the user is retrieved and the payment is authorized or denied based, at least partly, one whether the current location of the user corresponds to at least one of the authorized locations or at least one of the unauthorized locations associated with the account. The system and method allow an account holder restrict the use of an account to particular locations.

Referring now to FIGS. 1a and 1b, a method 100 for restricting a payment from an account based on a user location is illustrated. In the embodiment of the method 100 described below, an account provider provides an account holder with an account, and a user may use the account to fund payments for purchases made from merchants. The user may be the account holder or someone authorized by the account holder to use the account. In another embodiment, a payment service provider such as, for example, PayPal, Inc. of San Jose, Calif. assists in the making of payments from the user to the merchant by transferring funds from the account of the user to an account of the merchant. However, these embodiments are meant to be merely exemplary, and one of skill in the art will recognize that a variety of modifications may be made to the payment system discussed below without departing from the scope of the present disclosure.

The method 100 begins at blocks 102 and 104 where at least one payment location restriction is received (e.g., by a payment service provider device and/or an account provider device over a network) for the account of the account holder and that at least one payment location restriction is associated with an account. An account holder user having a user device 102a, illustrated in FIG. 1b, may access their account over a network (e.g., the Internet) by connecting to an account provider device of the account provider, or may access a payment service account over the network by connecting to a payment service provider device of a payment service provider. One of skill in the art will recognize that either or both of an account provider or a payment service provider may apply the payment location restrictions received by the account holder user to the account as is discussed below. While the user device 102a is illustrated and described below as a mobile device such as, for example, a mobile phone or computer, one of skill in the art will recognize that the setting of payment location restrictions for an account may be performed on a desktop computer, on other computing systems connected to a network, and/or using a variety of other devices known in the art.

By accessing their account, the payment system provides the account holder user with an option to location restrict the account. In the embodiment illustrated in FIG. 1b, the account holder user has accessed a payment service account provided by a payment service provider that allows the account holder user to make payments from any of a plurality of accounts 102b, 102c, and 102d, and the account holder user has selected the account 102c for location restriction. In response to selecting the account 102c for location restriction, the payment system presents the account holder user with a plurality of payment location restriction options including a zip code payment location restriction option 102e, a map payment location restriction option 102f, and a merchant payment location restriction option 102g. In an embodiment, the account holder user may be provided with an option to location restrict all of the accounts 102b, 102c, and 102d. One of skill in the art will recognize that the payment location restriction options 102e, 102f, and 102g discussed below are merely exemplary, and a variety of other payment location restriction options will fall within the scope of the present disclosure. In another embodiment, the account holder user may access an account provided by an account holder, and rather than being presented with multiple accounts, the account holder user may only be presented with the payment location restriction options for a single account (e.g., the account 102c.)

Figure 2:
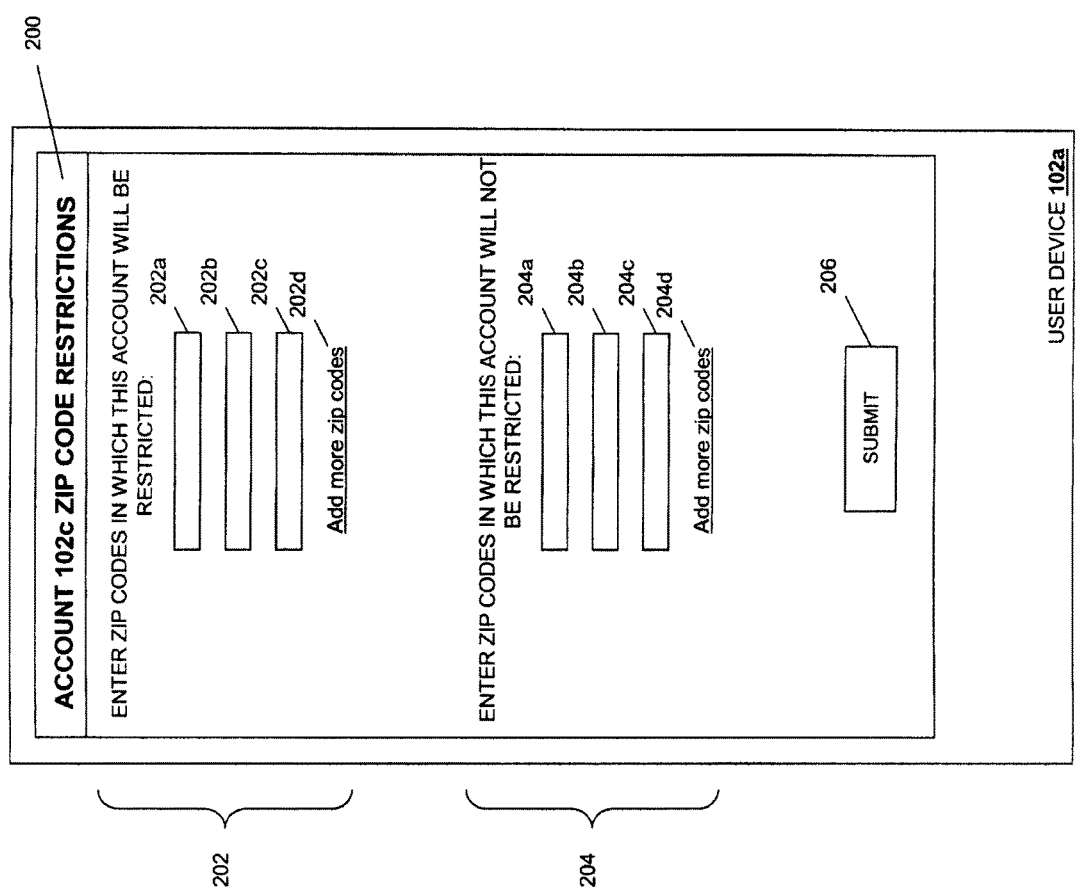
FIG. 2 is a front view illustrating an embodiment of user device being used to location restrict an account by providing zip codes.

Referring now to FIGS. 1a, 1b, and 2, a selection by the account holder user of the zip code payment location restriction option 102e results in the payment system presenting the account holder user (e.g., through the network to the user device 102a) with a zip code payment location restriction page 200 for the account 102c. The zip code payment location restriction page 200 includes a restricted zip codes section 202 and a non-restricted zip codes section 204. The restricted zip codes section 202 includes a plurality of zip code input fields 202a, 202b, and 202c, and an Add More Zip Codes command 202d. The non-restricted zip codes section 204 includes a plurality of zip code input fields 204a, 204b, and 204c, and an Add More Zip Codes command 204d. The account holder user may use the restricted zip codes section 202 to provide zip codes in which the account holder user wishes the account 102c to be restricted by, for example, entering zip codes into zip code input fields 202a, 202b, and 202c (and using the Add More Zip Codes command 202d to be provided with more zip code input fields if necessary.) The account holder user may use the non-restricted zip codes section 204 to provide zip codes in which the account holder user wishes the account 102c to not be restricted by, for example, entering zip codes into zip code input fields 204a, 204b, and 204c (and using the Add More Zip Codes command 202d to be provided with more zip code input fields if necessary.)

The account holder user may select a submit button 206 to apply the zip code payment location restrictions (i.e., zip codes entered into the zip code input fields 202a, 202b, 202c, 204a, 204b, and 204c) to the account 102c by, for example, sending the zip code payment location restrictions to the payment service provider device or account provider device over the network to be associated with the account in a database. In an embodiment, the association of the zip code payment location restrictions with the account 102c results in at least one authorized user location in which purchases may be made using the account and/or at least one unauthorized user location in which purchases may not be made using the account being associated with the account 102c the database, as described in further detail below.

Thus, the account holder may restrict the account 102c by providing one or more zip codes in which the account 102c should be restricted and/or by providing one or more zip codes in which the account 102c should not be restricted. For example, if the account holder user wishes for the account 102c to be restricted in a particular zip code, the account holder user may provide that zip code in one of the zip code input fields 202a, 202b, and 202c and select the submit button 206, and that will result in the account 102 being restricted in that zip code and not restricted outside that zip code. In another example, if the account holder user wishes for the account 102c to be restricted outside of a particular zip code, the account holder user may provide that zip code in one of the zip code input fields 204a, 204b, and 204c and select the submit button 206, and that will result in the account 102 being restricted outside of that zip code and not restricted within that zip code. One of skill in the art will recognize how combinations of the zip code input fields 202a, 202b, 202c, 204a, 204b, and 204c may be used to restrict and/or not restrict the account 102c in a plurality of zip codes. Furthermore, a variety of other options for restricting the account 102c by zip code may be provided to further focus the location restriction of the account 102c by zip code without departing from the scope of the present disclosure. While zip codes have been described for location restricting the account 102c, such an embodiment is merely exemplary, and a variety of other similar location restrictions such as, for example, location restriction by neighborhood, location restriction by state, location restriction by street or streets, etc., will fall within the scope of the present disclosure.

Figure 3:
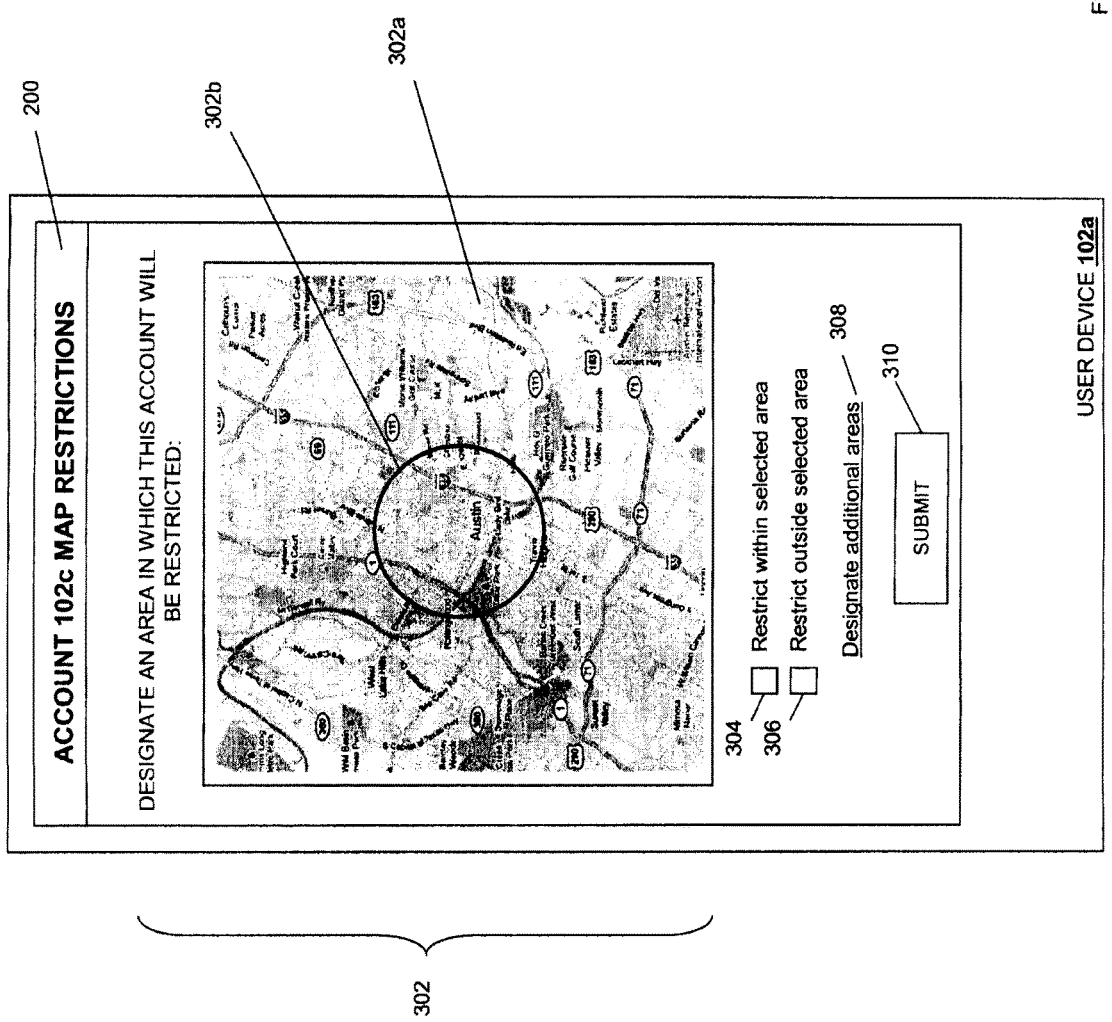
FIG. 3 is a front view illustrating an embodiment of user device being used to location restrict an account by selecting areas on a map.

Referring now to FIGS. 1a, 1b, and 3, a selection by the account holder user of the map payment location restriction option 102f results in the payment system presenting the account holder user (e.g., through the network to the user device 102a) with a map payment location restriction page 300 for the account 102c. The map payment location restriction page 300 includes a map restriction section 302, a Restrict Within Selected Area command 304, a Restrict Outside Selected Area command 306, and a Designate Additional Areas command 308. The map restriction section 302 provides the account holder user with a map 302a that the account holder user may use to select an area 302b to use in location restricting the account 102c. For example the user device 102a may be a touch sensitive device, and the account holder user may select and adjust the area 302b using the method know in the art (e.g., drawing with a finger, "reverse pinching" to select an area, etc.) In other example, the area 302b may be selected by the account holder user by keying in location coordinates, using a mouse, etc. The account holder user may then select either the Restrict Within Selected Area command 304 or the Restrict Outside Selected Area command 306 depending on whether the account holder user wishes the account 102c to be restricted within or outside the area 302b. Furthermore, the account holder user may select the Designate Additional Areas command 308 to select additional areas within or outside of which to restrict the account 102c.

When the areas for location restricting the account 102c have been selected, the account holder user may select a submit button 206 to apply the map payment location restriction (i.e., the area 302b or plurality of areas) to the account 102c by, for example, sending the map payment location restrictions to the payment service provider device or account provider device to be associated with the account in a database. In an embodiment, the association of the map payment location restrictions with the account 102c results in at least one authorized user location in which purchases may be made using the account and/or at least one unauthorized user location in which purchases may not be made using the account being associated with the account 102c the database, as described in further detail below.

Thus, the account holder may restrict the account 102c by providing one or more areas on a map in which the account 102c should be restricted and/or by providing one or more areas on a map in which the account 102c should not be restricted. For example, if the account holder user wishes for the account 102c to be restricted in a particular area 302b, the account holder user may select that area 302b on the map 302a and select the Restrict Within Selected Area command 304, and that will result in the account 102 being restricted in the area 302b and not restricted outside the area 302b. In another example, if the account holder user wishes for the account 102c to be restricted outside of a particular area 302b, the account holder user may select that area 303b in on the map 302a, and that will result in the account 102 being restricted outside of the area 302b and not restricted within the area 302b. One of skill in the art will recognize how different areas may be selected as restricted/not restricted in order to restrict and/or not restrict the account 102c in a plurality of different areas on the map 302a. Furthermore, a variety of other options for restricting the account 102c using the map 302a may be provided to further focus the location restriction of the account 102c without departing from the scope of the present disclosure. While a specific map and area selection process has been described for location restricting the account 102c, such an embodiment is merely exemplary, and a variety of other location restrictions using a map such as, for example, location restriction by neighborhood using the map, location restriction by state using the map, location restriction by street or streets using the map, etc., will fall within the scope of the present disclosure.

Figure 4:
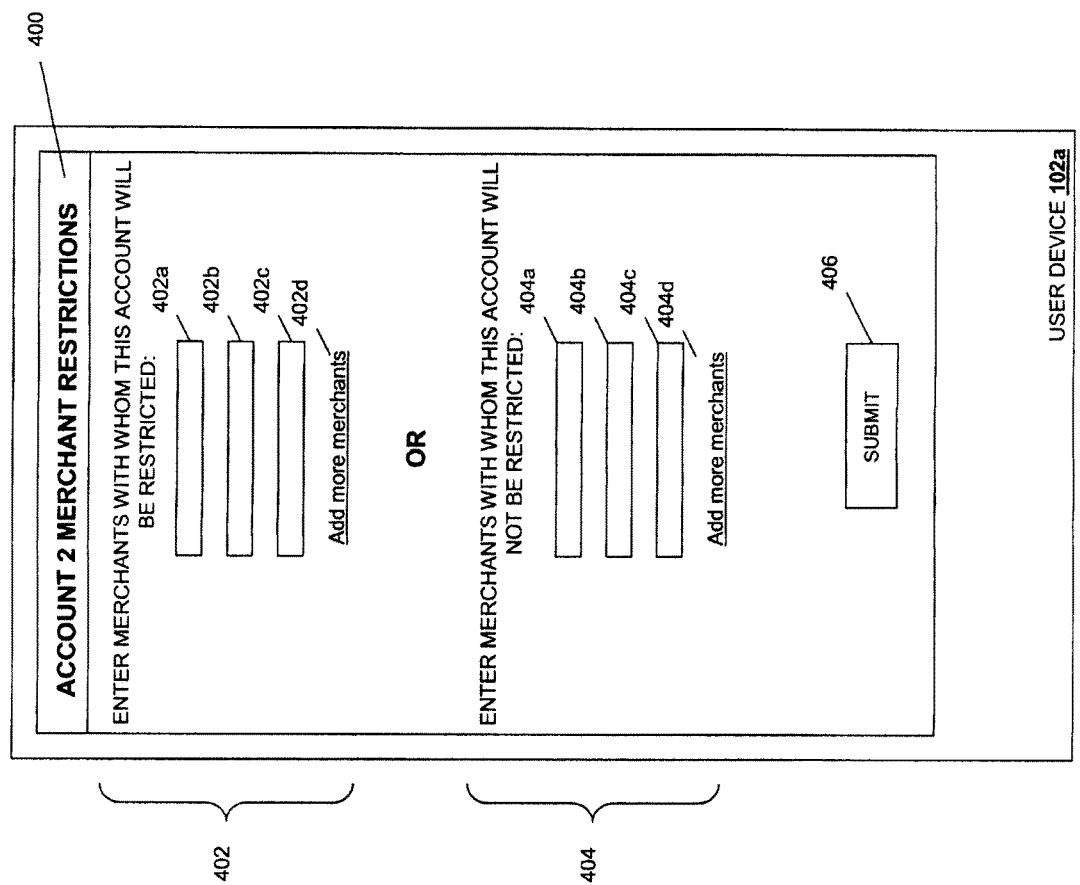
FIG. 4 is a front view illustrating an embodiment of user device being used to location restrict an account by providing merchants.

Referring now to FIGS. 1a, 1b, and 4, a selection by the account holder user of the merchant payment location restriction option 102g results in the payment system presenting the account holder user (e.g., through the network to the user device 102a) with a merchant payment location restriction page 400 for the account 102c. The merchant payment location restriction page 400 includes a restricted merchants section 402 and a non-restricted merchants section 404. The restricted merchants section 402 includes a plurality of merchant input fields 402a, 402b, and 402c, and an Add More Merchants command 402d. The non-restricted merchants section 404 includes a plurality of merchant input fields 404a, 404b, and 404c, and an Add More Merchants command 404d. The account holder user may use the restricted merchants section 402 to provide merchants with which the account holder user wishes the account 102c to be restricted by, for example, entering merchants into merchant input fields 402a, 402b, and 402c (and using the Add More Merchants command 202d to be provided with more merchant input fields if necessary.) The account holder user may use the non-restricted merchants section 204 to provide merchants with which the account holder user wishes the account 102c to not be restricted by, for example, entering merchants into merchant input fields 404a, 404b, and 404c (and using the Add More Merchants command 402d to be provided with more merchant input fields if necessary.)

The account holder user may select a submit button 406 to apply the merchant payment location restrictions (i.e., merchants entered into the merchant input fields 402a, 402b, 402c, 404a, 404b, and 404c) to the account 102c by, for example, sending the merchant payment location restrictions to the payment service provider device or account provider device to be associated with the account in a database. In an embodiment, the account holder user may provide a merchant name in the merchant input fields 402a, 402b, 402c, 404a, 404b, and 404c, and the payment service provider device and/or account provider device may use the merchant name to retrieve information related to that merchant such as, for example, locations of that merchant, the type of goods and/or services that merchant provides, and/or a variety of other merchant information known in the art. In an embodiment, the association of the merchant payment location restrictions with the account 102c results in at least one authorized user location in which purchases may be made using the account and/or at least one unauthorized user location in which purchases may not be made using the account being associated with the account 102c the database, as described in further detail below.

Thus, the account holder may restrict the account 102c by providing one or more merchants with which the account 102c should be restricted and/or by providing one or more merchants with which the account 102c should not be restricted. For example, if the account holder user wishes for the account 102c to be restricted with a particular merchant, the account holder user may provide that merchant in one of the merchant input fields 402a, 402b, and 402c and select the submit button 406, and that will result in the account 102 being restricted for use with that merchant and not restricted for other merchants. In another example, if the account holder user wishes for the account 102c only to be used with only a particular merchant, the account holder user may provide that merchant in one of the merchant input fields 404a, 404b, and 404c and select the submit button 406, and that will result in the account 102 not being restricted for use only with that particular merchant and being restricted for use with other merchants. One of skill in the art will recognize how combinations of the merchant input fields 402a, 402b, 402c, 404a, 404b, and 404c may be used to restrict and/or not restrict the account 102c for use with a plurality of merchants. Furthermore, a variety of other options for restricting the account 102c by merchant may be provided to further focus the location restriction of the account 102c by merchant without departing from the scope of the present disclosure. While merchants have been described for location restricting the account 102c, such an embodiment is merely exemplary, and a variety of other location restrictions such as, for example, location restriction by purchase type (e.g., alcohol, clothing, etc.), location restriction by merchant type (liquor store, clothing store, etc.), location restriction by merchant location (a particular shopping mall or group of malls, a particular flea market, a particular event (e.g., all merchants located at a music festival, farmers market, etc.), etc.), and/or a variety of other locations will fall within the scope of the present disclosure.

Furthermore, the accounts may be restricted using combinations of the payment location restriction options 102e, 102f, and/or 102g. For example, the account holder user may restrict the account 102c to particular merchants (using the merchant payment location restriction option 102g) in a particular area (using the map payment location restriction option 102f.) One of skill in the art will recognize that variety of combinations of the payment location restriction options 102e, 102f, and/or 102g may be used to restrict and/or not restrict the account 102.

Other ways to select restricted or unrestricted locations may also be suitable. For example, the account holder may enter an address, a city, a county, or other geographical area as a restricted or unrestricted area. The account holder may also specify a distance from the entered area, such as 10 miles extending from beyond the entered area.

Figure 5:
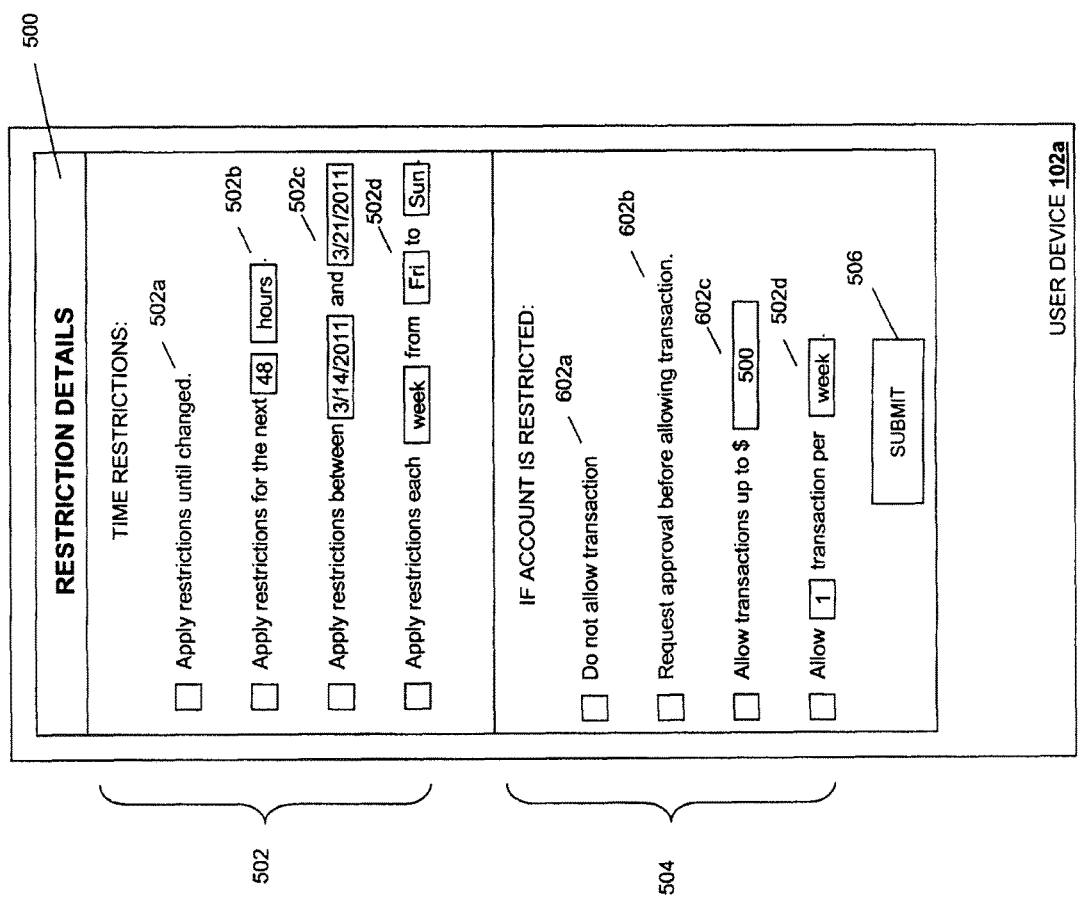
FIG. 5 is a front view illustrating an embodiment of user device being used to location restrict an account by providing time details and rules.

In an embodiment, any of the payment location restriction options 102e, 102f, and/or 102g may include restriction details that may be selected by the account holder user and applied to the account 102c upon the account holder user selecting the submit buttons 206, 306, and/or 406. Referring now to FIG. 5, an embodiment of a restriction details page 500 is illustrated that the payment system may present to the account holder user upon the account holder user providing at least one zip code on the zip code payment location restriction page 200, selecting an area to restrict on the map payment location restriction page 300, and/or providing at least one merchant on the merchant payment location restriction page 400. The restriction details page 500 includes a time details section 502 and a rules section 504. The time details section 502 includes an Apply Restrictions Until Changed time detail 502a, an Apply Restrictions For An Amount Of Time time detail 502b, an Apply Restrictions For A Time Period time detail 502c, and a Apply Restrictions For A Reoccurring Time Period time detail 502d. The rules section 504 includes a Do Not Allow Transaction rule 502a, a Request Approval Before Allowing Transaction rule 502b, a Allow Transaction Up To An Amount rule 502c, and an Allow Transactions At A Predetermined Frequency 6ule 502d. The account holder user may then use the time details section 502 to associate time details with the location restrictions on the account 102c and/or use the rules section 504 to associate rules with the location restrictions on the account 102c.

For example, the account holder user may want to associate time details with payment location restrictions applied to the account. If the account holder user wishes for any payment location restrictions applied to the account 102c to be applied until the account holder users directs them to be changed, the account holder user may select the Apply Restrictions Until Changed time detail 502a. If the account holder wishes for any payment location restrictions applied to the account 102c to be applied for a specific amount of time, the account holder user may modify input boxes (e.g., "48 hours" in the illustrated embodiment) in the Apply Restrictions For an Amount Of Time time detail 502b and select it. If the account holder wishes to for any payment location restrictions applied to the account 102c to be applied during a specific time period, the account holder user may modify input boxes (e.g., between two dates in the illustrated embodiment) in the Apply Restrictions For A Time Period time detail 502c and select it. If the account holder wishes for any payment location restrictions applied to the account 102c to be applied during the same time period on a reoccurring basis, the account holder user may modify input boxes (e.g., weekly between specific days in the illustrated embodiment) in the Apply Restrictions For A Reoccurring Time Period time detail 502d and select it. In an embodiment, the association of time details with payment location restrictions results in at least one active time period for the payment location restriction and/or at least one inactive time period for the payment location restriction being associated with the account 102c the database, as discussed in further detail below.

In another example, the account holder user may want to associate rules with payment location restrictions applied to the account. If the account holder user wishes for any payment location restrictions applied to the account 102c to result in transactions not being allowed using the account if the account is restricted, the account holder user may select the Do Not Allow Transaction rule 502a. If the account holder user wishes for any payment location restrictions applied to the account 102c to result in approval being requested from the account holder before allowing a transaction if the account is restricted, the account holder user may select the Request Approval Before Allowing Transaction rule 502b. If the account holder user wishes for any payment location restrictions applied to the account 102c to result in only transactions below a certain amount being allowed if the account is restricted, the account holder user may modify input boxes (e.g., "$500" in the illustrated embodiment) in the Allow Transaction Up To An Amount rule 502c and select it. If the account holder user wishes for any payment location restrictions applied to the account 102c to result in only transactions only being allowed at a predetermined frequency if the account is restricted, the account holder user may modify input boxes (e.g., 1 transaction per week in the illustrated embodiment) in the Allow Transactions At A Predetermined Frequency rule 502d and select it.

One of skill in the art will recognize how combination of the time details 502a, 502b, 502c, and/or 502d and/or combinations of the rules 504a, 504b, 504c, and/or 504dmay be applied to the payment location restrictions discussed above to precisely restrict the use of the account 102c. Furthermore, the time details and rule discussed above are meant to be merely exemplary, and one of skill in the art will recognize how a variety of other time details, rules, and other options for restricting the account 102*c* may be provided to further focus the location restriction of the account 102*c* without departing from the scope of the present disclosure.

Furthermore, the association of the time details and the rules with the payment location restrictions may determine whether a particular payment location restriction results in the authorized user locations or unauthorized user locations discussed above. For example, if the Do Not Allow Transaction rule 502*a* is associated with a payment location restriction, then a current user location applied to that payment location restriction will be an unauthorized user location. However, if a time detail only applies that payment location restriction that includes the Do Not Allow Transaction rule 502*a* for a particular period of time, then a current user location applied to that payment location restriction will be an unauthorized user location during that particular period of time and an authorized user location outside that particular period of time. Thus, one of skill in the art will recognize how authorized and unauthorized user locations may be determined using the payment location restrictions, time details, and/or rules such that that they may vary not only with location, but with time and purchase details as well.

Referring now to FIG. 1*a*, the method 100 then proceeds to blocks 106 where a request to make a payment using an account is received from a user (e.g., by a payment service provider device and/or an account provider device over the network.) In an embodiment, the user may be the account holder user discussed above. However, in an embodiment, the user may be an user that the account holder user has authorized to make purchases using the account.

In one embodiment, the request to make the payment using the account is sent by the user from a mobile user device over the network. For example, the user may use a mobile user device (e.g., a phone or other mobile computing device) to attempt to purchase goods and/or services from a merchant. Thus, using details from the examples discussed above, the user may enter account information (e.g., a login identification and password) for the account 102*c* into the mobile user device to access the account, and then send a payment request that may indicate the merchant and a purchase amount over the network (e.g., to a payment service provider device and/or account provider device.)

The method 100 then proceeds to block 108 where a current user location is determined. In an embodiment, the payment request automatically include location data from the mobile use device. For example, the mobile use device may include a location determination device that is operable to determine the location of the mobile use device (e.g., a Global Positioning System (GPS) device, a cell tower triangulation system device, and/or a variety of other location determination devices known in the art), and location data from the location determination device may be included in the payment request. That location data is then received along with the payment request by the payment service provider device and/or account provider device and may be used to determine the current user location (i.e., the location of the mobile user device at the time the payment request is sent.) In another embodiment, part of sending the payment request may include providing a confirmation of the current user location.

Figure 6:
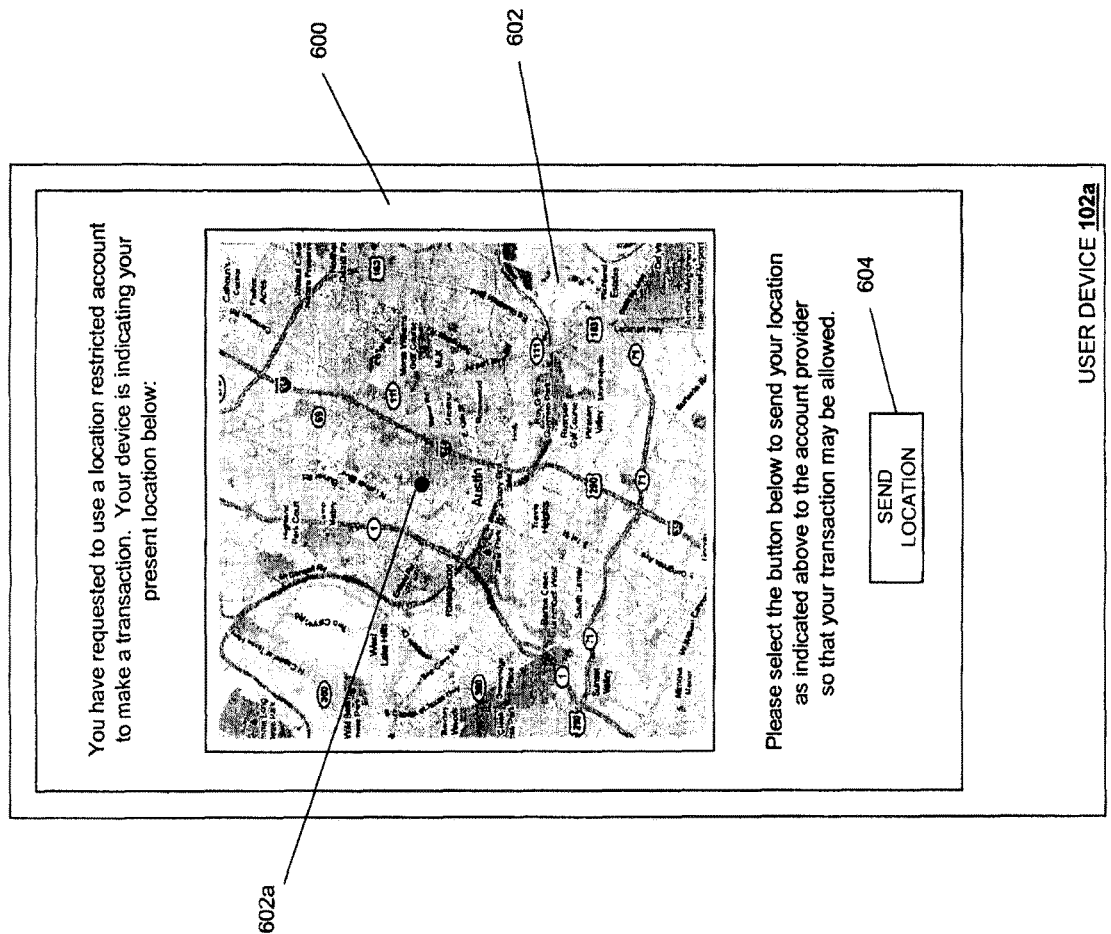
FIG. 6 is a front view illustrating an embodiment of user device being used to provide a current user location.

For example, as illustrated in FIG. 6, when attempting to send a payment request, the user may be presented with a current location confirmation page 600 that may include a map 602 having an indication 602*a* of the current location of the mobile user device 102*a*, and the user may select a Send Location button 604 to confirm the current user location indicated by the indication 602*a* and send that current user location (e.g., location data from the mobile user device 102*a*) to the payment service provider device and/or the account provider device so that the current user location may be determined in block 108 of the method 100. However, the user may simply be presented with the Send Location button 604 to confirm the current user location (e.g., by sending location data from the mobile user device 102*a*.) In another embodiment, in response to receiving the payment request in block 106 of the method 100, the payment service provider device and/or the account provider device may send a current location confirmation to the mobile user device 102*a* that may include some or all of the features of the current location confirmation page 600 discussed above with reference to FIG. 6, and use current user location that is received in response is used to determine the current user location in block 108 of the method 100. In an embodiment, the sending of a current location confirmation by the payment service provider device and/or the account provider device may be performed in response to determining that the account for which the payment request is received is associated with at least one payment location restriction.

The method 100 then proceeds to decision block 110, where it is determined whether the current user location is included at least one authorized location or at least one unauthorized user location associated with the account. The payment service provider device and/or the account provider device may access the database that includes at least one authorized user location and/or at least one unauthorized user location that has been associated with the account according to blocks 102 and 104 of the method 100 and determine if the current user location determined in block 108 of the method 100 is included in the at least one of the authorized or unauthorized user locations.

For example, a payment service provider device and/or an account provider device may use location data sent by the mobile user device 102*a* to determine a current zip code in which the mobile user device 102*a* is located at the time of the purchase request. The payment service provider device and/or an account provider device may then access the database that includes the zip code payment location restrictions that were associated with the account in blocks 102 and 104 of the method 100 and determine whether the current zip code corresponds to an authorized user location in which the purchases may be made using the account or an unauthorized user location in which purchases may not be made using the account. In an embodiment, if the current zip code corresponds to an authorized user location, then the method 100 proceeds to block 112 where the request to make the payment using the account is authorized by the payment service provider device and/or the account provider device, and in response, funds may be transferred from the account to a merchant account associated with the merchant with whom the purchase is being made. If the current zip code corresponds to an unauthorized user location, then the method 100 proceeds to block 114 where the request to make the payment using the account is denied by the payment service provider device and/or the account provider device such that no funds are transferred from the account to a merchant account associated with the merchant with whom the purchase is being made.

In another example, a payment service provider device and/or an account provider device may use location data sent by the mobile user device 102*a* with the map payment location restrictions that were associated with the account in blocks 102 and 104 of the method 100 and determine whether the location data falls with an area (e.g., the area 302b illustrated in FIG. 3) that corresponds to an authorized user location in which the purchases may be made using the account or an unauthorized user location in which purchases may not be made using the account. In an embodiment, if the location data falls within an area that corresponds to an authorized user location, then the method 100 proceeds to block 112 where the request to make the payment using the account is authorized by the payment service provider device and/or the account provider device, and in response, funds may be transferred from the account to a merchant account associated with the merchant with whom the purchase is being made. If the location data falls within an area that corresponds to an unauthorized user location, then the method 100 proceeds to block 114 where the request to make the payment using the account is denied by the payment service provider device and/or the account provider device such that no funds are transferred from the account to a merchant account associated with the merchant with whom the purchase is being made.

In another example, a payment service provider device and/or an account provider device may use location data sent by the mobile user device 102a to determine whether the mobile user device 102a (and thus the user) is located at a particular merchant (e.g., by retrieving a merchant location associated with the merchant.) The payment service provider device and/or an account provider device may then access the database that includes the merchant payment location restrictions that were associated with the account in blocks 102 and 104 of the method 100 and determine whether the location data indicates that the user is located at a merchant corresponding to an authorized user location in which the purchases may be made using the account or an unauthorized user location in which purchases may not be made using the account. In an embodiment, if the location data indicates that the user is located at a merchant corresponding to an authorized user location, then the method 100 proceeds to block 112 where the request to make the payment using the account is authorized by the payment service provider device and/or the account provider device, and in response, funds may be transferred from the account to a merchant account associated with the merchant with whom the purchase is being made. If the location data indicates that the user is located at a merchant corresponding to an unauthorized user location, then the method 100 proceeds to block 114 where the request to make the payment using the account is denied by the payment service provider and/or the account provider such that no funds are transferred from the account to a merchant account associated with the merchant with whom the purchase is being made.

While zip code payment locations restrictions, map payment location restrictions, and merchant payment location restrictions have been discussed above as being used separately to determine if the current user location is included in the at least one authorized user location at block 110, one of skill in the art will recognize that they may be combined and/or used with other payment location restrictions at decision block 110 without departing from the scope of the present disclosure.

In another embodiment, the determination of whether the current user location is included in at least one or at least one unauthorized user location at block 110 may also involve the payment service provider device and/or the account provider device using the time details that were associated with the payment location restrictions in blocks 102 and 104 of the method 100. For example, the payment request received at block 106 may include a current time (or the current time may be independently determined by the payment service provider device and/or the account provider device,) and the payment service provider device and/or account provider device may access the database to determine whether the current time corresponds to an active time or an inactive time for the payment location restrictions. If the current time corresponds to an active time for the payment location restriction, the payment service device and/or the account provider device will apply the payment location restriction as discussed above. If the current time corresponds to an inactive time for the payment location restriction, the payment service device and/or the account provider device will not apply the payment location restriction.

In another embodiment, the determination of whether the current user location is included in at least one or at least one unauthorized user location at block 110 may also involve the payment service provider device and/or the account provider device using the rules that were associated with the payment location restrictions in blocks 102 and 104 of the method 100. For example, the payment service provider device and/or account provider device may access the database and determine that the Do Not Allow Transaction rule 502a has been selected for a payment location restriction corresponding to a particular zip code, area on a map, or location of a merchant. Thus, if the current user location indicates that the user is attempting to use the account in that zip code, area on a map, or merchant location, the system will determine that the user is in an unauthorized user location and deny the request to make a payment using the account. However, in another embodiment, along with the Do Not Allow Transaction rule 502a having been selected for a payment location restriction corresponding to a particular zip code, area on a map, or location of a merchant, a time detail may be provided to give the restriction an active time period only on the weekends. Thus, if the current user location indicates that the user is attempting to use the account in that zip code, area on a map, or merchant location, but it is not a weekend, the system will determine that the user is in an authorized user location and authorize the request to make a payment using the account.

As another example of rules being associated with payment location restrictions, the payment service provider and/or account provider may access the database and determine that the Request Approval Before Allowing Transaction rule 502b has been selected for a payment location restriction corresponding to a particular zip code, area on a map, or location of a merchant. In this example, if the current user location indicates that the user is attempting to use the account in that zip code, area on a map, or merchant location, the payment system may send an approval request to the account holder user (e.g., an email, a text message, a phone call, and/or a variety of other similar requests known in the art.) If the account holder approves the approval request (e.g., by replying appropriately to the approval request,) the payment system will determine that the user is in an authorized user location and authorize the request to make a payment using the account. If the account holder denies the approval request or does not reply to the approval request in a predetermined amount of time, the payment system will determine that the user is in an unauthorized user location and deny the request to make a payment using the account.

As another example of rules being associated with payment location restrictions, the payment service provider and/or account provider may access the database and determine that the Allow Transaction Up To An Amount rule 502c has been selected for a payment location restriction corresponding to a particular zip code, area on a map, or location of a merchant. In this example, if the current user location indicates that the user is attempting to use the account in that zip code, area on a map, or merchant location, the payment system may access the database to determine whether the purchase amount received with the payment request is below a predetermine amount provided by the account holder with the Allow Transaction Up To An Amount rule 502c. If the purchase amount is below the predetermined amount, the payment system will determine that the user is in an authorized user location and authorize the request to make a payment using the account. If the purchase amount is above the predetermined amount, the payment system will determine that the user is in an unauthorized user location and deny the request to make a payment using the account.

As another example of rules being associated with payment location restrictions, the payment service provider and/or account provider may access the database and determine that the Allow Transactions At A Predetermined Frequency rule 502d has been selected for a payment location restriction corresponding to a particular zip code, area on a map, or location of a merchant. In this example, if the current user location indicates that the user is attempting to use the account in that zip code, area on a map, or merchant location, the payment system may access the database to determine whether a time period has elapsed since the last use of the account in that zip code, area on a map, or merchant location exceeds a predetermined time period provided by the account holder with the Allow Transaction Up To An Amount rule 502c. If the time period exceeds the predetermined time period, the payment system will determine that the user is in an authorized user location and authorize the request to make a payment using the account. If the time period does not exceed the predetermined time period, the payment system will determine that the user is in an unauthorized user location and deny the request to make a payment using the account.

As another example of rules being associated with payment location restrictions, an account holder user may restrict the account for use only at a music festival in a particular location by, for example, using the payment locations restrictions discussed above, and then provide that the account may not be used at any "bars" or "night clubs" or for purchases of "alcohol" by associating appropriate rules with the payment location restrictions. Thus, a user of the account would them be able to make purchases using the account at the music festival location, unless those purchases were made at a bar, night club, or for alcohol.

As another example of a payment location restriction, an account holder user may restrict the account for use (or for no use) at "malls" in a designated area (e.g., a city), by using the payment locations restrictions discussed above. Thus, a user of the account would them be able to make purchases (or be restricted from making purchases) using the account at malls in the designated area.

In another embodiment, the merchant payment location restrictions may be used without the location data from the mobile user device 102a. For example, as discussed above, the payment request provided from the user may include a merchant along with a purchase amount. The payment service provider device and/or account provider device may access the database and determine whether the merchant provided on the payment request corresponds to an authorized user location or an unauthorized user location according to the merchant payment location restrictions (e.g., whether the merchant name on the payment request is included in merchant names that have been restricted as unauthorized user locations for the account.) If the merchant provided on the payment request corresponds to an authorized user location, the method 100 proceeds to block 112 where the request to make the payment using the account is authorized by the payment service provider device and/or the account provider device, and in response, funds may be transferred from the account to a merchant account associated with the merchant with whom the purchase is being made. If the merchant provided on the payment request corresponds to an unauthorized user location, then the method 100 proceeds to block 114 where the request to make the payment using the account is denied by the payment service provider and/or the account provider such that no funds are transferred from the account to a merchant account associated with the merchant with whom the purchase is being made. While restriction of account usage by merchant based on a merchant name has been discussed above, one of skill in the art will recognize that restriction of account usage by merchant may be based on purchase type, merchant type, etc., without departing from the scope of the present disclosure.

Another embodiment of the method 100 is substantially as described above, but with modified blocks 106 and 108. As discussed above, at block 106, a request to make a payment using an account is received from a user (e.g., by a payment service provider and/or an account provider.) In this embodiment, the request to make the payment using the account is sent by a merchant device over the network. For example, the user may use a credit card or other similar payment device to attempt to purchase goods and/or services from a merchant. Thus, using details from the examples discussed above, the merchant enters account information from the credit card for the account 102c into the merchant device, and then sends a payment request that indicates the merchant and a purchase amount over a network (e.g., to a payment service provider and/or account provider.) Then, at block 108 of the method 100, the current user location may be determined in a number of ways.

In one embodiment, similarly as discussed above with reference to FIG. 6, in response to receiving the payment request from the merchant device, the payment service provider device and/or the account provider device may send a current location confirmation to a mobile user device associated with the account, and the user attempting to make the payment using the credit card may be required to provide a current user location from a mobile user device 102a in order for the transaction to proceed. In another embodiment, information included in the payment request from the merchant device may be used to determine a current user location such as, for example, location data from the merchant device, merchant information associated with the merchant, and/or a variety of other methods known in the art for determining a merchant, and thus a current user location. The method 100 then uses the current user location in decision block 110 to determine whether to authorize or deny the payment request received from the merchant in blocks 112 and 114 substantially as discussed above.

Thus, a system and method for restricting an account based on a user location is provided that allows an account holder to define locations, times, and/or rules to be associated with an account. When an attempt is made to use the account to make a purchase, those defined locations, times, and/or rules are referenced to determine whether the use of the account is authorized by the account holder. Such systems and methods allow an account holder to precisely define how, when, and where an account may be used by users of that account.

Figure 7:
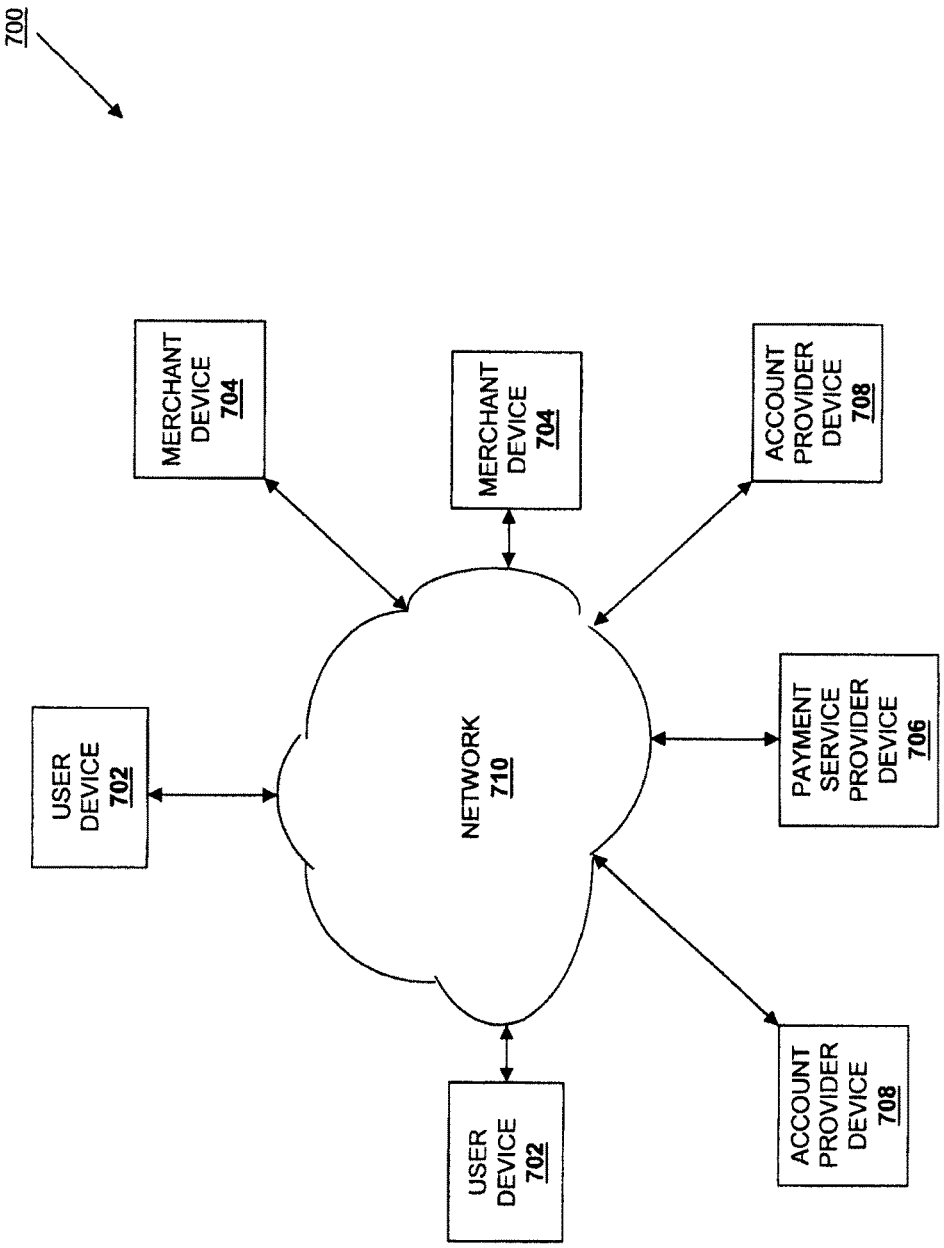
FIG. 7 is a schematic view illustrating an embodiment of a networked system.

Referring now to FIG. 7, an embodiment of a networked system 700 used in the payment system described above is illustrated. The networked system 700 includes a plurality of user devices 702, a plurality of merchant devices 704, a payment service provider device 706, and a plurality of account holder devices 708 in communication over a network 710. Any of the user devices 702 may be the user device 102a, discussed above. The merchant devices 704 may be the merchant devices discussed above and may be operated by the merchants discussed above. The payment service provider device 706 may be the payment service provider devices discussed above and may be operated by a payment service provider such as, for example, PayPal Inc. of San Jose, Calif. The account provider devices 708 may be operated by the account providers discussed above such as, for example, credit card account providers, bank account providers, savings account providers, and a variety of other account providers known in the art.

The user devices 702, merchant devices 704, payment service provider device 706, and account holder devices 708 (discussed in further detail below) may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The user device 702 may be implemented using any appropriate combination of hardware and/or software configured for wired and/or wireless communication over network 710. For example, in one embodiment, the user device 702 may be implemented as a personal computer of a user in communication with the Internet. In other embodiments, the user device 702 may be a smart phone, personal digital assistant (PDA), laptop computer, and/or other types of computing devices.

The user device 702 may include one or more browser applications which may be used, for example, to provide a convenient interface to permit the payer to browse information available over the network 710. For example, in one embodiment, the browser application may be implemented as a web browser configured to view information available over the Internet.

The user device 702 may also include one or more toolbar applications which may be used, for example, to provide user-side processing for performing desired tasks in response to operations selected by the user. In one embodiment, the toolbar application may display a user interface in connection with the browser application.

The user device 702 may further include other applications as may be desired in particular embodiments to provide desired features to the user device 702. In particular, the other applications may include a payment application for payments assisted by a paymenet service provider through the payment service provider device 706. The other applications may also include security applications for implementing user-side security features, programmatic user applications for interfacing with appropriate application programming interfaces (APIs) over the network 710, or other types of applications. Email and/or text applications may also be included, which allow the user to send and receive emails and/or text messages through the network 710. The user device 702 includes one or more user and/or device identifiers which may be implemented, for example, as operating system registry entries, cookies associated with the browser application, identifiers associated with hardware of the user device 702, or other appropriate identifiers, such as a phone number. In one embodiment, the user identifier may be used by the payment service provider device 706 and/or account provider device 708 to associate the user with a particular account as further described herein.

The merchant device 704 may be maintained, for example, by a conventional or on-line merchant, conventional or digital goods seller, individual seller, and/or application developer offering various products and/or services in exchange for payment to be received conventionally or over the network 710. In this regard, the merchant device 704 may include a database identifying available products and/or services (e.g., collectively referred to as items) which may be made available for viewing and purchase by the user.

The merchant device 704 also includes a checkout application which may be configured to facilitate the purchase by the user of items. The checkout application may be configured to accept payment information from the user through the user device 702, the account provider through the account provider device 708, and/or from the payment service provider through the payment service provider device 706 over the network 710.

Figure 8:
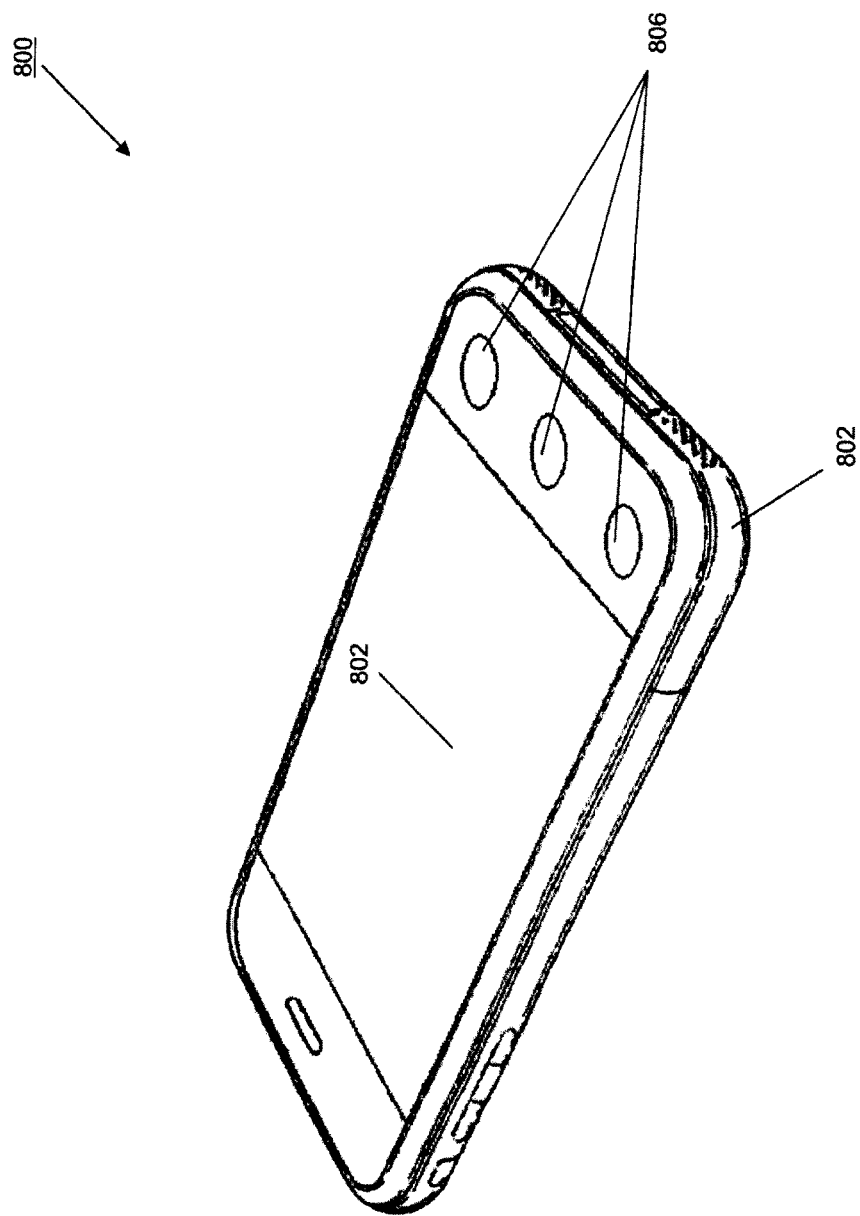
FIG. 8 is a perspective view illustrating an embodiment of a user device.

Referring now to FIG. 8, an embodiment of a user device 800 is illustrated. The user device 800 may be the user devices 102a and/or 702. The user device 800 includes a chassis 802 having a display 804 and an input device including the display 804 and a plurality of input buttons 806. One of skill in the art will recognize that the payer device 800 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 9:
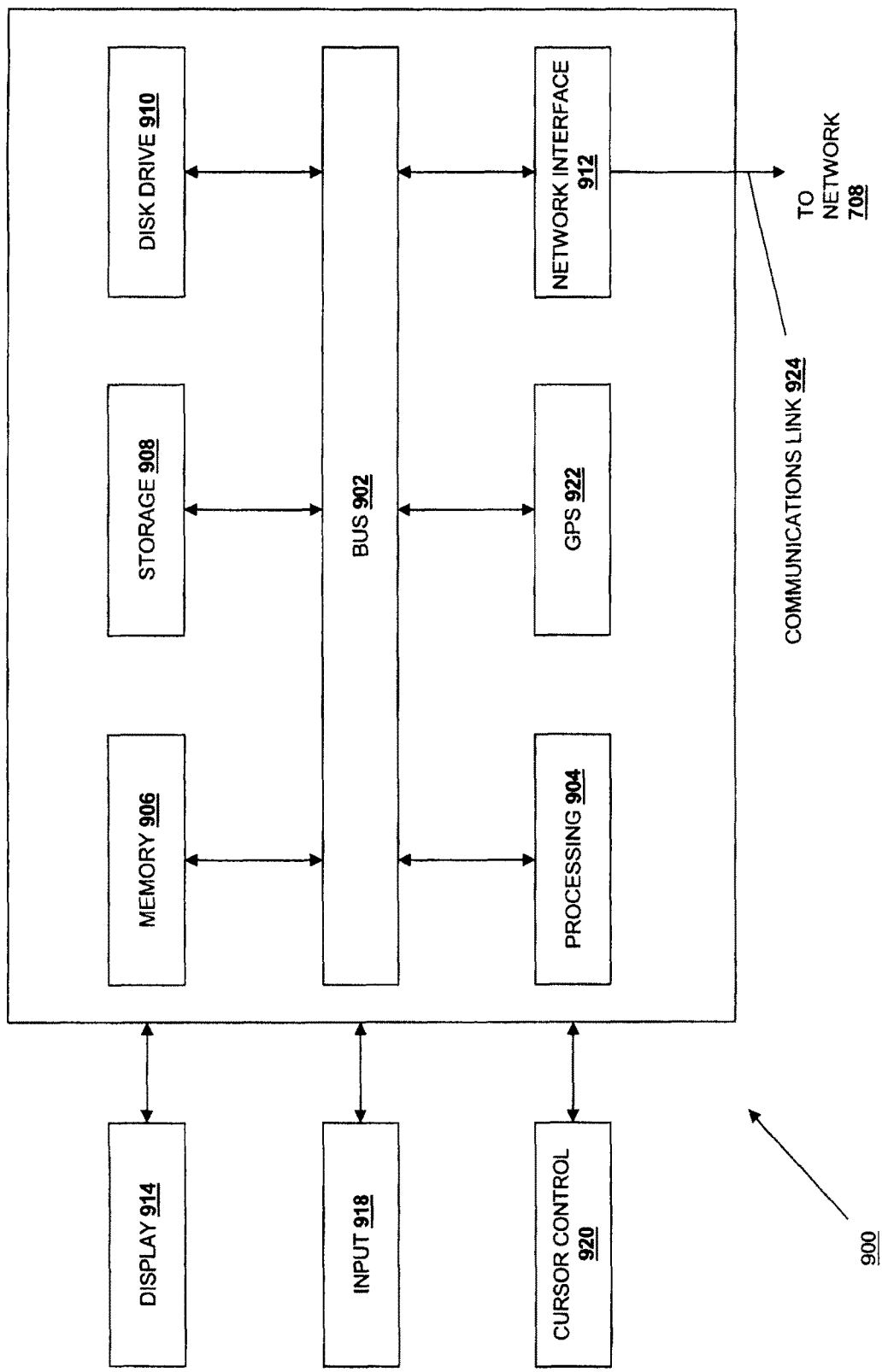
FIG. 9 is a schematic view illustrating an embodiment of a device that may be used by users, merchants, payment service providers, and/or account providers.

Referring now to FIG. 9, an embodiment of a computer system 900 suitable for implementing, for example, the user device 102a, the user device 702, the user device 800, the merchant device 704, the payment service provider device 706, and/or the account provider device 708, is illustrated. It should be appreciated that other devices utilized by users, merchants, payment service providers, and account providers in the payment system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user device 102a, 702, and 800, the merchant device(s) 704, the payment service provider device 706, and/or the account provider device(s) 708. Such instructions may be read into the system memory component 906 from another computer readable medium, such as the static storage component 908 or the disk drive component 910. In other embodiments, hardwired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 710 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
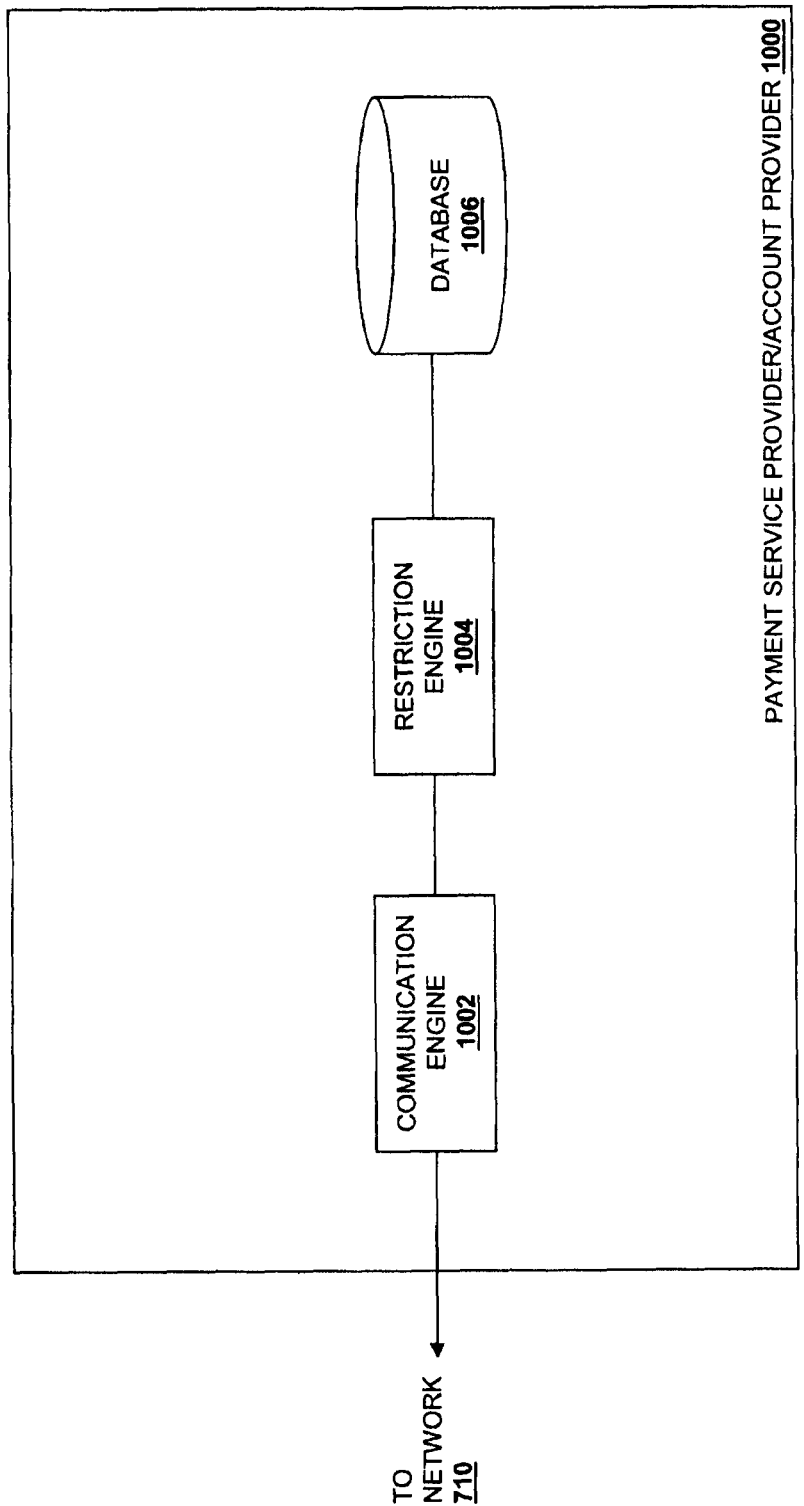
FIG. 10 is a perspective view illustrating an embodiment of a payment service provider device and/or account provider device.

Referring now to FIGS. 10, an embodiment of a payment service provider device/account provider device 1000 is illustrated. In an embodiment, the device 1000 may be the payment service provider device 706 and/or the account holder device 708. The device 1000 includes a communication engine 1002 that is coupled to the network 710 and to a restriction engine 1004 that is coupled to a database 1006. The communication engine 1002 may be software or instructions stored on a computer-readable medium that allows the device 1000 to send and receive information over the network 710. The restriction engine 708 may be software or instructions stored on a computer-readable medium that is operable to receive payment location restrictions, time details, and rules and associate them with accounts in the database 1006, receive payment requests, current user locations, and other data to determine whether a user is in an authorized user location or unauthorized user location in order to authorize or deny a payment request, and provide any of the other functionality that is discussed above. While the database 1006 has been illustrated as located in the payer device 1000, one of skill in the art will recognize that it may be connected to the restriction engine 1004 through the network 710 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for restricting payments from accounts, comprising:
   receiving, from a mobile device over a network connection, a payment request to make a payment to a payee using an account;
   accessing a payment location restriction for the account associated with an account holder, wherein the payment location restriction includes an unauthorized user location for making payments using the account, the unauthorized user location being defined by a user selection of a first area, on a digital map, as the unauthorized user location;
   receiving current mobile device location coordinates over the network connection from the mobile device;
   determining that the current mobile device location coordinates are included in the unauthorized user location for making payments using the account, wherein the current mobile device location coordinates match the unauthorized user location; and
   transmitting, over the network connection, a response to the payment request denying the payment request based on a determination that the current mobile device location coordinates match the unauthorized user location.

2. The method of claim 1, wherein the method further comprises:
   in response to receiving the payment request, accessing a time detail for the payment location restriction from the mobile device over the network connection, wherein the time detail includes an active time period for applying the payment location restriction; and
   determining a current time and authorizing or denying the payment request based on whether the current time is included in the active time period.

3. The method of claim 1, further comprising:
   in response to receiving the payment request, accessing a rule for the payment location restriction from the account holder over the network connection, wherein the rule is applied to one payment location restriction in order to authorize or deny the payment request to make the payment using the account; and
   authorizing or denying the payment request based on whether the rule is satisfied.

4. The method of claim 3, wherein the rule includes receiving the response from the mobile device over the network connection when the current mobile device location coordinates are included in the unauthorized user location for making payments using the account.

5. The method of claim 3, wherein the authorizing or the denying further comprises determining that an amount of the payment is below a predetermined amount.

6. The method of claim 3, wherein the authorizing or the denying further comprises determining whether a time period, which has elapsed since a last use of the account in a current location that includes the current mobile device location coordinates, exceeds a predetermined time period.

7. The method of claim 1, wherein the current mobile device location coordinates include triangulation system coordinates.

8. The method of claim 1, wherein the current mobile device location coordinates include Global Positioning System (GPS) coordinates.

9. The method of claim 1, wherein payment location restriction includes an authorized user location for making payments using the account, and wherein the authorized user location includes a second area on the digital map that is mutually exclusive from the first area.

10. A non-transitory machine-readable medium having stored thereon machine-readable instructions executable to cause a machine to perform operations comprising:
    receiving, from a mobile device of a user over a network connection, a payment request to make a payment to a payee using an account of the user;
    accessing, in response to the receiving of the payment request, a database to retrieve a payment location restriction that is associated with the account, wherein the payment location restriction includes an unauthorized user location that is defined by a user selection of a first area, on a digital map, as the unauthorized user location;
    receiving current mobile device location coordinates over the network connection from the mobile device;
    determining, based on the current mobile device location coordinates, that the mobile device is within the unauthorized user location; and
    transmitting, over the network connection, a response to the payment request denying the payment request based on a determination that the mobile device is within the unauthorized user location.

11. The non-transitory machine-readable medium of claim 10, wherein the operations further comprise:
    in response to receiving the payment request, accessing a time detail for the payment location restriction from the mobile device over the network connection, wherein the time detail includes an active time period for applying the payment location restriction; and
    determining a current time and authorizing or denying the payment request based on whether the current time is included in the active time period.

12. The non-transitory machine-readable medium of claim 10, wherein the operations further comprise:
    in response to receiving the payment request, accessing a rule for the payment location restriction from the user over the network connection, wherein the rule is applied to the payment location restriction in order to authorize or deny the payment request to make the payment using the account; and
    authorizing or denying the payment request based, at least partly, on whether the rule is satisfied.

13. The non-transitory machine-readable medium of claim 12, wherein the operations further comprise receiving the response from the mobile device over the network connection when the current mobile device location coordinates are included in the unauthorized user location for making payments using the account.

14. The non-transitory machine-readable medium of claim 12, wherein the authorizing or the denying further comprises determining that an amount of the payment is below a predetermined amount.

15. The non-transitory machine-readable medium of claim 12, wherein the authorizing or the denying further determining whether a time period, which has elapsed since a last use of the account in a current location that includes the current mobile device location coordinates, exceeds a predetermined time period.

16. The non-transitory machine-readable medium of claim 10, wherein the current mobile device location coordinates include triangulation system coordinates.

17. The non-transitory machine-readable medium of claim 10, wherein the current mobile device location coordinates include Global Positioning System (GPS) coordinates.

18. A payment system for restricting payments from accounts, comprising:
   a non-transitory memory; and
   one or more hardware processors coupled to the non-transitory memory and configured to execute instructions to cause the payment system to perform operations comprising:
      receiving, from a mobile device over a network connection, a payment request to make a payment to a payee using an account;
      accessing a payment location restriction for an account from the mobile device associated with an account holder, wherein the payment location restriction includes an unauthorized user location for making payments using the account, the unauthorized user location being defined by a user selection of a first area, on a digital map, as the unauthorized user location;
      receiving current mobile device location coordinates over the network connection from the mobile device;
      determining, that the current mobile device location coordinates are included in the unauthorized user location for making payments using the account, wherein the current mobile device location coordinates match the unauthorized user location; and
      transmitting, over the network connection, a response to the payment request from the mobile device denying the payment request based on the determination that the current mobile device location coordinates match the unauthorized user location.

19. The payment system of claim 18, wherein the operations further comprising:
   in response to receiving the payment request, accessing a time detail for the payment location restriction from the mobile device, wherein the time detail includes an active time period for applying the payment location restriction; and
   determining a current time in response to receiving the payment request to make the payment using the account, wherein the denying the payment request authorizes or denies the payment request based on whether the current time is included in the active time period.

20. The payment system of claim 18, wherein the operations further comprising:
   in response to receiving the payment request, receiving a rule for the payment location restriction from the mobile device, wherein the rule is applied to the payment location restriction in order to authorize or deny the payment request to make the payment using the account; and
   authorizing or denying the payment request based on whether the rule is satisfied.

* * * * *